INVENTOR
WILLIAM LONSDALE
BY
ATTORNEY

Jan. 16, 1945. W. LONSDALE 2,367,226
APPARATUS FOR PRODUCING EXTENDED SURFACE TUBULAR MEMBERS
Filed May 10, 1940 3 Sheets-Sheet 2
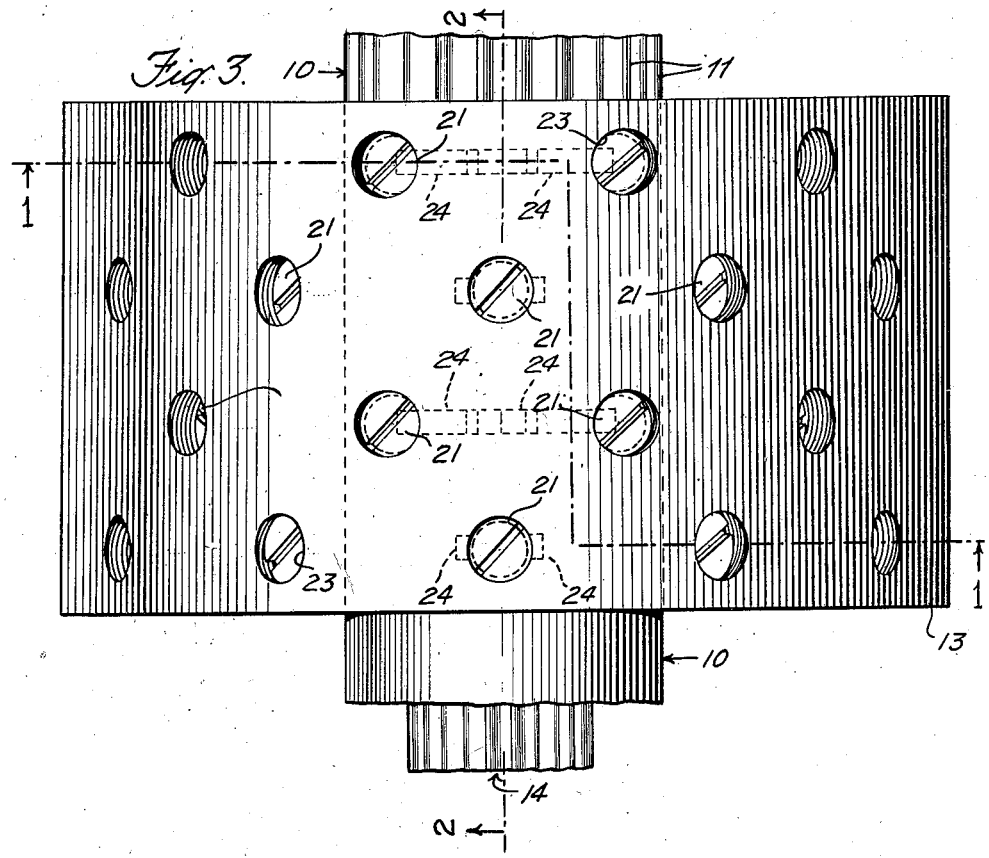
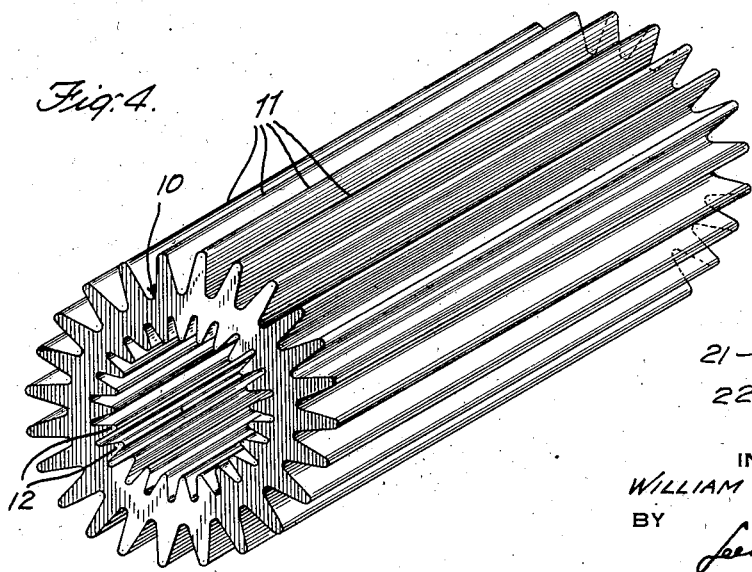
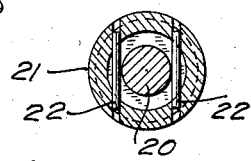
INVENTOR
WILLIAM LONSDALE
BY
ATTORNEY Jan. 16, 1945.  W. LONSDALE  2,367,226
APPARATUS FOR PRODUCING EXTENDED SURFACE TUBULAR MEMBERS
Filed May 10, 1940  3 Sheets-Sheet 3
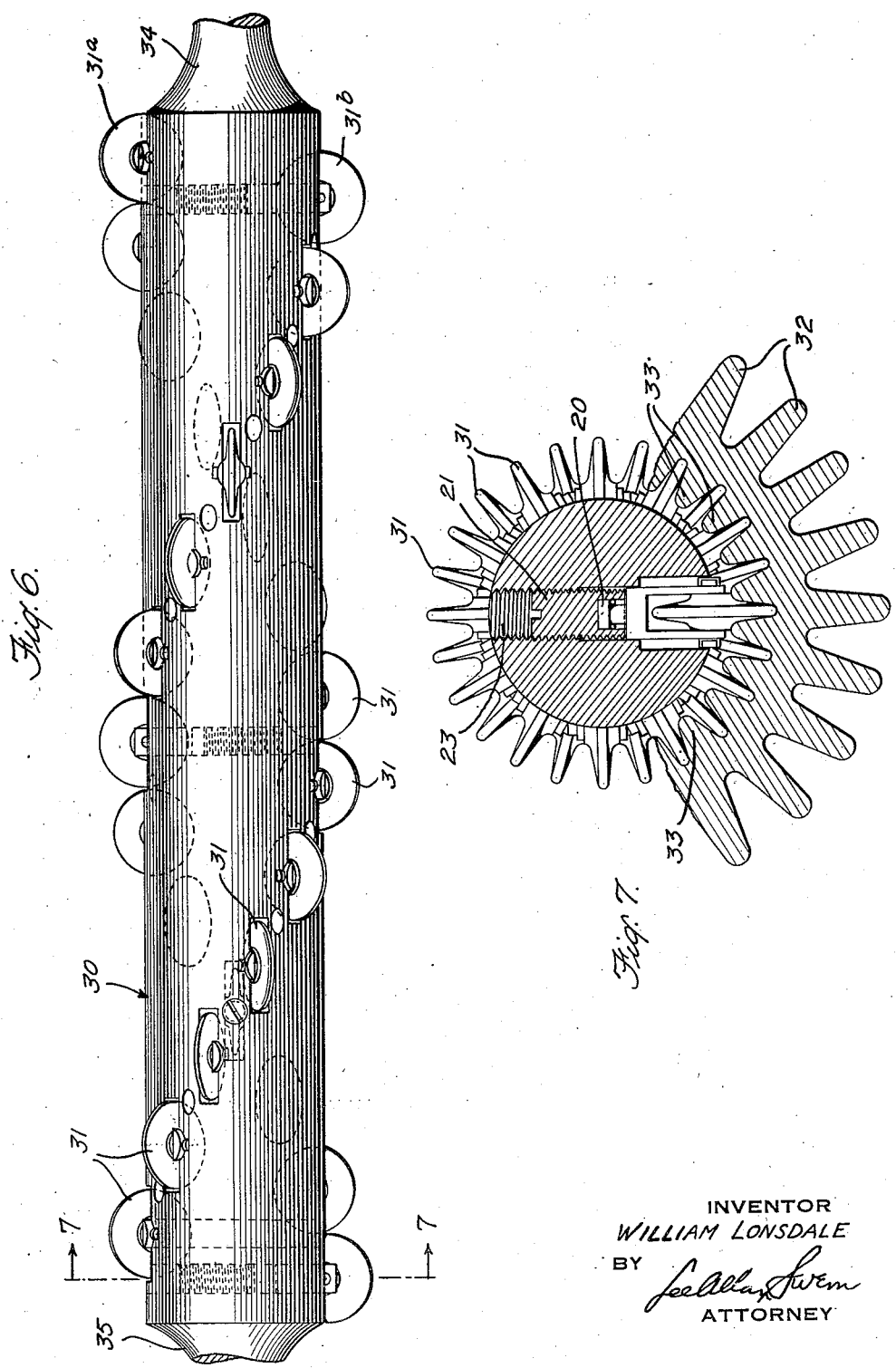
INVENTOR
WILLIAM LONSDALE
BY
ATTORNEY Patented Jan. 16, 1945

2,367,226

UNITED STATES PATENT OFFICE 2,367,226

APPARATUS FOR PRODUCING EXTENDED SURFACE TUBULAR MEMBERS

William Lonsdale, Roselle Park, N. J., assignor to Foster Wheeler Corporation, New York, N. Y., a corporation of New York Application May 10, 1940, Serial No. 334,351

13 Claims. (Cl. 80—11)

This invention relates to tubular members having extended surface elements and more particularly pertains to apparatus for producing such extended surface tubular members.

The invention provides novel apparatus for producing a tubular member having forged, integral, longitudinal fins or extended surface elements projecting from the inner periphery of the tubular member, or from the outer periphery of the tubular member, or from both the inner and outer peripheries.

The invention will be understood from the following description when considered in connection with the accompanying drawings forming a part thereof and in which:

Fig. 3 is a top plan view of the apparatus and tubular member shown in Fig. 1;

Fig. 4 is a perspective view of one form of finished tubular member embodying the invention;

Fig. 5 is a sectional view taken on line 5—5 of Fig. 1;

Fig. 6 is a longitudinal elevational view of another form of mandrel embodying the invention, and Fig. 7 is a sectional view taken on line 7—7 of Fig. 6, showing also in partial transverse section, a tubular member produced by means of the mandrel shown in Fig. 6.

Like characters of reference refer to the same or to similar parts throughout the several views.

Figure 1:
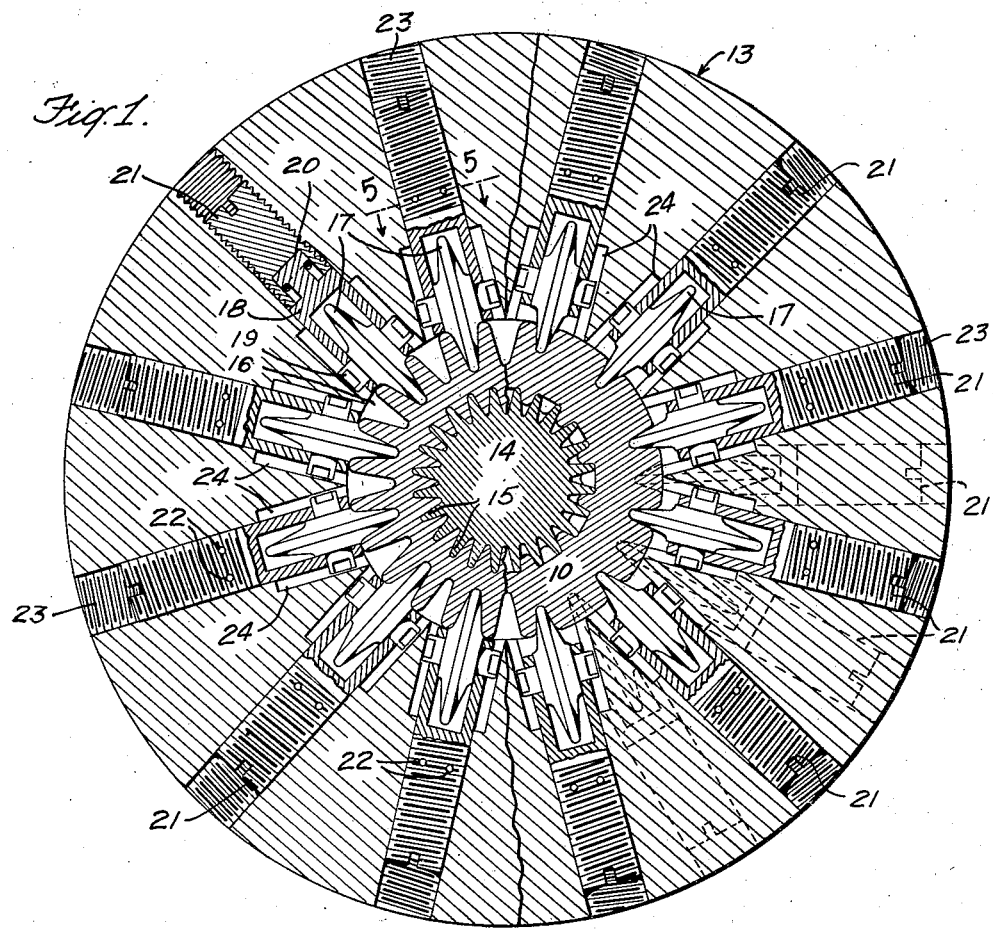
Fig. 1 is a transverse sectional view taken on irregular section line 1—1 of Fig. 3, showing one form of apparatus for producing one form of a tubular member embodying the invention.

The invention will be disclosed in connection with a tubular member having extended surface elements projecting both from the inner periphery and the outer periphery thereof. However, it will be understood that the invention is not limited to this particular form of the invention or to the particular form of apparatus disclosed. From the following disclosure, those skilled in the art will be able to produce tubular members having extended surface elements projecting from the inner periphery only, or from the outer periphery only, and it will be perceived that the invention includes these forms of extended surface tubular members.

Referring to the drawings, particularly Figs. 1 to 5 inclusive, reference character 10 designates a tubular member having a plurality of spaced, longitudinally extending integral fins or extended surface elements 11 projecting from the outer periphery of the tubular member and having a plurality of spaced, longitudinally extending integral fins or extended surface elements 12 projecting from the inner periphery of the tubular member. The apparatus for producing the tubular member 10 includes a die 13 and a mandrel 14. The mandrel 14 is provided with a plurality of spaced, longitudinally extending projections 15 which are spaced and shaped to form the inner extended surface elements 12 of the tubular member when the metal of the tubular member is forced into the spaces between these projections. The mandrel is placed inside of the tube and the tube with the mandrel therein is then pulled or forced through the die 13 by any suitable means, well known to those skilled in the art, which means includes suitable arrangements for positioning the die 13 and maintaining it in its position during the formation of the tubular member.

The die 13 comprises a cylindrical member of relatively short axial length, having an axially disposed bore or opening 16 which is large enough in diameter to provide a running fit with the finished tubular member 10. The die is provided with a plurality of rollers 17 each of which has a diameter and a configuration such as to form the extended surface elements 11 of the character desired on the outside of the tubular member. As shown, the rollers 17 are positioned in the die 13 in longitudinally and transversely extending rows and are radially positioned in the die as shown. Two rollers 17 are disposed in each longitudinal row and twelve rollers are arranged in each of the four transverse rows, with the rollers in each transverse row disposed in staggered relationship with the rollers in adjacent rows. The supporting means for the rollers prevent wobbling of the rollers and also provide an adjustment whereby the radial position of each roller with respect to the die 13 may be changed. As shown, such roller supporting means comprises a yoke 18 to support the roller shaft 19 which extends slightly beyond the outer surface of the yoke. The yoke has an extension 20 which is received in a cylindrical opening in one end of a set screw 21 and is maintained within this opening by means of spaced pins 22 which pass through the set screw adjacent the wall of a portion of reduced diameter of the extension 20. The yoke 18 is formed to be received with a smooth running fit in the inner end of a radial opening 23 in the die 13, the outer portion of which is threaded to receive the set screw 21. As shown in Figs. 1 and 3, the die 13 is also provided with oppositely disposed recesses 24 which communicate with the radially inner portion of the cylindrical opening 23 to receive the outer ends of the shaft 19 of the roller 17 to maintain the roller in proper position for forming the extended surface elements and also to permit radial movement of the roller for adjustment.

Figure 2:
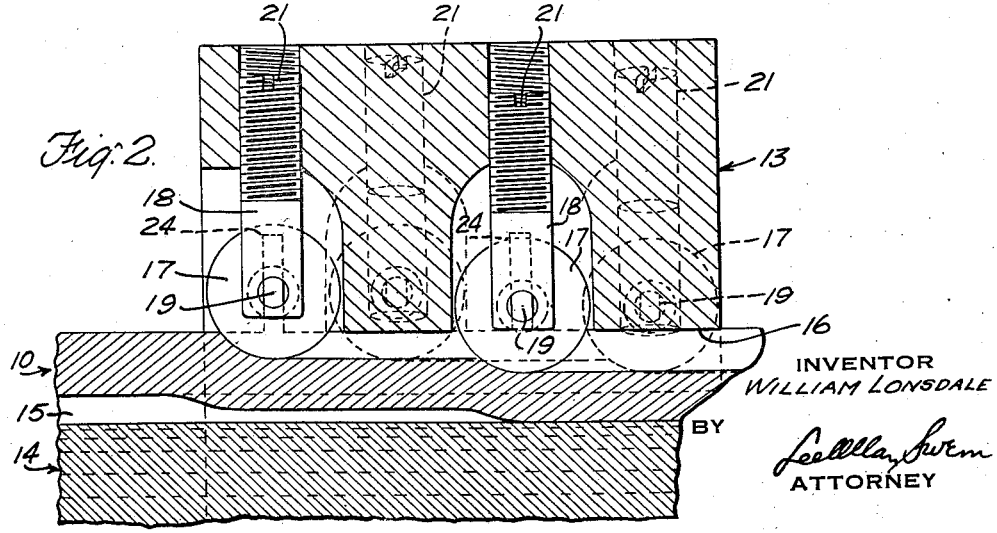
Fig. 2 is a partial longitudinal sectional view taken on line 2—2 of Fig. 3.

In operation, the tube to be formed is placed upon the mandrel 14 and the die 13 is mounted in a die-block. The rollers 17 in the first two transverse rows of the die 13 which come in contact with the tube to be formed, are adjusted to form grooves in the tube of a predetermined depth, and the rollers of the other two transverse rows of the die 13 are adjusted to increase the depth of the grooves formed by the rollers of the first two rows, substantially as shown in Fig. 2. The particular setting of the forward and following rollers will depend upon the characteristics of the metal of the tube being formed and the number of passes to be made in forming the extended surface elements. The tube and the mandrel are placed with the leading end in contact with the forward rollers of the die 13, with the grooves in the mandrel 14 which are intermediate the projections 15, in alignment with the circumferential edges of the rollers. The tube and mandrel are forced or drawn through the die 13, as a result of which the rollers 17 will form grooves in the outer peripheral portion of the tube with the partially formed extended surface elements between these grooves. Simultaneously, the action of the rollers 17 will force the metal of the tube into the grooves between the projections on the mandrel 14, thereby partially forming extended surface elements on the inside of the tube in radial alignment with the grooves between the extended surface elements on the outside of the tube. After the first pass has been completed, the forward and following rollers in the die 13 are adjusted radially inwardly to the extent desired or required for the next succeeding pass, and the partially formed tube and the mandrel therein are again passed through the die 13 to make the previously formed grooves deeper which, of course, further extends the fins or extended surface elements on both the outside and the inside of the tube. Further adjustments of the rollers inwardly of the die 13 and further passes of the tube through the die are made until the tube is completely formed with extended surface elements on the inside and the outside of the tube. If desired, suitable means such as a stop, not shown, may be provided to engage the following end of the tube to prevent elongation of the tube while it is being drawn through the die 13, to cause the metal of the tube to flow, or to be forced into, the grooves in the mandrel 14. After the tube is finished, it is stripped off of the mandrel 14.

If the material of the tube upon which the fins or extended surface elements are to be formed is of hard or alloy metal, and the metal of the tube will not flow or project into the grooves of the mandrel 14 to the desired extent to provide fins which project from the inside of the tube as far as may be required, a roller mandrel such as shown in Figs. 6 and 7 may be utilized to complete the formation of the fins on the inside of the tube. This mandrel comprises an elongated, cylindrical member 30 having a plurality of groove and find forming rollers 31 mounted therein. These rollers, their mounting in the cylindrical member 30, and their adjustment with respect to this member, are the same as the rollers, their mountings and adjustments in the die 13, excepting for the positions of the rollers in the member 30 and their relationship to each other. As shown in Figs. 6 and 7, the rollers 31 are arranged in two separate helices with the leading roller 31a of one helix and the leading roller 31b of the other helix disposed as nearly diametrically opposite as the dimensions of the cylindrical member 30 will permit. Inasmuch as the yokes and adjusting members for each roller are in separate diametrically disposed bores in the member 30 in the form shown, it will be understood that the rollers of the two helices will not be disposed diametrically opposite. The number of rollers 31 and their spacing may be varied as desired.

In operation, the tube to be formed is placed on a mandrel 14 and is passed through the die 13 the desired number of times to completely form the outer fins or extended surface elements 32, Fig. 7, and to partially form the inner fins or extended surface elements 33. The tube with the partially formed inner fins is stripped off of the mandrel 14 and is thereafter drawn over the roller mandrel the desired number of times to completely form the fins 33 on the inside of the tube. It will be understood that the rollers 31 on the roller mandrel are adjusted to extend from the cylindrical member 30 the desired amount so that adequate work will be done on the tube by each of the rollers or by the selected number of rollers. In other words, the forward or leading rollers will be adjusted to a certain position and the following rollers or a selected number of the following rollers will be adjusted to project farther outwardly radially of the member 30 than the leading rollers. Suitable means such as indicated at 34 and 35, are provided at opposite ends of the roller die to support the die and to maintain it in position while the tube is being drawn over the die. Or if desired, the tube may be maintained in a stationary position and the roller mandrel 30 drawn or forced through the tube. It will be understood, of course, that the rollers 31 in the mandrel will be aligned with the grooves on the inside of the tube during all passes of the tube with respect to the mandrel. In this manner the partially formed fins on the inside of the tube will be completed without altering, or substantially altering, the fins on the outside of the tube.

The fins on the tube may be formed while the metal of the tube is either cold or hot.

If it is desired to form fins on the outside of the tube only, the apparatus of Figs. 1 to 3 will be employed excepting that the mandrel 14 will comprise a cylindrical member without projections. With a cylindrical mandrel, it will be understood that as the tube and mandrel are passed successively through the die 13, the metal of the tube will flow, or will be forced, into the outside fins only so that no inside fins will be formed.

If it is desired to form fins on the inside of the tube only, a mandrel like mandrel 14 will be utilized and the tube and mandrel will be passed successively through an ordinary die having a circular opening and without rollers or projections which bear against the tube, so that successive passes of the tube and mandrel through the die will cause the metal to flow, or to be forced, into the space between the projections on the mandrel 14.

From the foregoing it will be perceived that a tubular member having integral longitudinally extending fins may be produced readily, efficiently and at low cost by the practice of the invention. Tubing may be formed with fins both on the inside and outside of the tube or with fins on the inside of the tube only or on the outside of the tube only. The apparatus employed permits the use of a single die for the outside fins, because of the adjustability of the fin forming rollers, thereby eliminating the necessity for utilizing a multiplicity of dies for different passes of the tube as the formation of the fins progresses. The same is true, of course, with respect to the roller mandrel disclosed in Figs. 6 and 7. A single mandrel only of the character disclosed need be used, in lieu of a plurality of mandrels for successive passes.

It will be understood that changes may be made in the form, location and relative arrangement of the several parts of the apparatus disclosed and in the particular configuration of the fin tube disclosed, as well as in the number of fins, their shape and their spacing, all without departing from the principles of the invention. The number of fins to be formed on a tube may be varied as desired, and their particular cross-sectional configuration may be changed by changing the configuration of the rollers which form the grooves and the fins. Roller mounting means and roller adjusting means other than those disclosed may be employed and other changes which will occur to those skilled in the art may be made, all within the scope of the invention. No limitation therefore, is to be placed upon the invention excepting by the scope of the appended claims.

What is claimed is:

1. Apparatus for forming extended surface elements on the inner and outer peripheries of a tubular member comprising a mandrel adapted to be inserted in the tubular member and having a plurality of fin forming recesses therein, and a die having a plurality of rollers adapted to engage the outer periphery of the tubular member to form the metal thereof to provide extended surface elements on the outside of the member and to force the metal of the member into the recesses of the mandrel to provide extended surface elements on the inside of the member, the rollers in the die being in substantial alignment with the recesses in the mandrel during formation of the extended surface elements.

2. Apparatus for forming an integral extended surface element on the inner and on the outer periphery of a tubular member comprising a mandrel adapted to be inserted within the tubular member and having a plurality of longitudinally extending grooves, and a die having an opening adapted to receive the tubular member, the die having a roller supported thereon in substantial radial alignment with a groove in the mandrel so as to engage the outer peripheral portion of the tubular member upon insertion in said opening and to form the material of said member.

3. Apparatus for forming an integral extended surface element on the inner and on the outer periphery of a tubular member comprising a mandrel adapted to be inserted within the tubular member and having a plurality of longitudinally extending grooves, a die having an opening adapted to receive the tubular member, the die having a roller supported thereon in substantial radial alignment with a groove in the mandrel so as to engage the outer peripheral portion of the tubular member upon insertion in said opening and to form the material of said member, and means for adjusting the position of said roller radially with respect to the axis of said opening in the die.

4. Apparatus for forming integral, longitudinally disposed, extended surface elements on the inner and on the outer periphery of a tubular member comprising a mandrel adapted to be inserted within the tubular member and having a plurality of longitudinally extending grooves, and a die having an opening adapted to receive the tubular member, the die having a plurality of rollers supported thereon in substantial radial alignment with grooves in the mandrel and disposed to engage the outer peripheral portion of the tubular member upon insertion in said opening to form a plurality of longitudinally extending grooves and a plurality of extended surface elements between said grooves.

5. Apparatus for forming integral, longitudinally disposed, extended surface elements on the inner and on the outer periphery of a tubular member comprising a mandrel having a plurality of longitudinally extending grooves having substantially the configuration of the elements to be formed on the inner periphery of the member, and a die having an opening adapted to receive the tubular member, the die having a plurality of rollers supported thereon and disposed to engage the outer peripheral portion of the tubular member upon insertion in said opening, the rollers being disposed in substantial radial alignment with grooves in the mandrel and having substantially the configuration of the grooves to be formed between the extended surface elements on the outer periphery of the tubular member.

6. Apparatus for forming integral, longitudinally disposed, extended surface elements on the inner and on the outer periphery of a tubular member comprising a mandrel having a plurality of longitudinally extending grooves having substantially the configuration of the elements to be formed on the inner periphery of the member, a die having an opening adapted to receive the tubular member, the die having a plurality of rollers supported thereon and disposed to engage the outer peripheral portion of the tubular member upon insertion in said opening, the rollers being disposed in substantial radial alignment with grooves in the mandrel and having substantially the configuration of the grooves to be formed between the extended surface elements on the outer periphery of the tubular member, and means for adjusting the positions of said rollers to vary the extent to which they project into said opening.

7. Apparatus for forming integral, longitudinally disposed, extended surface elements on the inner periphery of a tubular member comprising a mandrel, a plurality of rollers carried by the mandrel, means for supporting the rollers so that their axes will be substantially normal to the axis of the mandrel, and means for adjusting the positions of said rollers to vary the extent to which they project from the mandrel comprising a member rotatably secured to the roller supporting means to rotate on an axis substantially at right angles to the axis of rotation of the roller and threaded into the mandrel for adjusting the position of the roller supporting means to vary the extent to which the rollers project from the mandrel.

8. Apparatus for forming integral, longitudinally disposed, extended surface elements on the inner periphery of a tubular member comprising a mandrel, a plurality of rollers, a yoke for supporting each roller, and mounting means comprising a member rotatably secured to said yoke to rotate on an axis substantially at right angles to the axis of rotation of the roller and threaded into the mandrel for adjusting the position of each yoke to vary the extent to which the rollers project from the mandrel.

9. Apparatus for forming integral, longitudinally disposed, extended surface elements on the inner periphery of a tubular member comprising a mandrel having a plurality of screw-threaded apertures extending therethrough at substantially right angles to the axis of the mandrel, a plurality of rollers carried by the mandrel, means for supporting the rollers so that their axes will be substantially normal to the axis of the mandrel, and mounting means comprising a screw-threaded member rotatably secured to the roller supporting means to rotate on an axis substantially at right angles to the axis of rotation of the rollers and adapted to engage the screw-threads in the apertures for adjusting the position of each supporting member to vary the extent to which the rollers project from the mandrel.

10. Apparatus for forming an integral extended surface element on the inner and on the outer periphery of a tubular member comprising a mandrel having projections on the periphery thereof circumferentially spaced to form a plurality of spaces extending longitudinally of the mandrel, and a die having an opening adapted to receive the tubular member, the die having a roller supported thereon in substantial radial alignment with a space between the projections on the mandrel so as to engage the outer peripheral portion of the tubular member upon insertion in said opening and to form the material of said member.

11. Apparatus for forming an integral extended surface element on the inner and on the outer periphery of a tubular member comprising a mandrel having projections on the periphery thereof circumferentially spaced to form a plurality of spaces extending longitudinally of the mandrel, a die having an opening adapted to receive the tubular member, the die having a roller supported thereon in substantial radial alignment with a space between the projections on the mandrel so as to engage the outer peripheral portion of the tubular member upon insertion in said opening and to form the material of said member, and means for adjusting the position of said die roller radially with respect to the axis of said opening in the die.

12. Apparatus for forming integral, longitudinally disposed, extended surface elements on the inner and on the outer periphery of a tubular member comprising a mandrel having projections on the periphery thereof circumferentially spaced to form a plurality of spaces extending longitudinally of the mandrel, and a die having an opening adapted to receive the tubular member, the die having a plurality of rollers supported thereon, each roller being in substantial radial alignment with one of the spaces on the mandrel so as to engage the outer peripheral portion of the tubular member upon insertion in said opening and to form a plurality of longitudinally extending grooves and a plurality of extended surface elements between said grooves.

13. Apparatus for forming an integral extended surface element on the inner and on the outer periphery of a tubular member comprising a mandrel having a plurality of rollers projecting from the periphery of the mandrel, said rollers being circumferentially spaced to form a plurality of spaces extending longitudinally of the mandrel, means for adjusting the positions of said rollers to vary the extent to which they project from the mandrel, a die having an opening adapted to receive the tubular member, the die having a plurality of rollers supported thereon in substantial radial alignment with the space between the rollers on the mandrel so as to engage the outer peripheral portion of the tubular member upon insertion in said opening and to form the material of said member, and means for adjusting the position of said die rollers radially with respect to the axis of said opening in the die.

WILLIAM LONSDALE.